United States Patent
Li et al.

(10) Patent No.: US 12,046,133 B2
(45) Date of Patent: Jul. 23, 2024

(54) DETECTION METHOD OF KEY ROAD-SECTIONS BASED ON RICCI FLOW

(71) Applicants: Central South University, Changsha (CN); Chongqing Geomatics and Remote Sensing Center, Chongqing (CN)

(72) Inventors: Haifeng Li, Changsha (CN); Jian Peng, Changsha (CN); Penglong Li, Changsha (CN); Zezhong Ma, Changsha (CN); Yi Ding, Changsha (CN); Zelie Zhang, Changsha (CN); Ding Luo, Changsha (CN); Jiawei Zhu, Changsha (CN); Silu He, Changsha (CN); Yan Li, Changsha (CN); Zhenqi Cui, Changsha (CN); He Xiao, Changsha (CN); Ying Ao, Changsha (CN); Tao Zhang, Changsha (CN)

(73) Assignees: CENTRAL SOUTH UNIVERSITY, Changsha (CN); CHONGQING GEOMATICS AND REMOTE SENSING CENTER, Chongqing (CN)

( * ) Notice: Subject to any disclaimer, the term of this patent is extended or adjusted under 35 U.S.C. 154(b) by 341 days.

(21) Appl. No.: 17/553,101

(22) Filed: Dec. 16, 2021

(65) Prior Publication Data
US 2022/0108603 A1    Apr. 7, 2022

Related U.S. Application Data

(63) Continuation of application No. PCT/CN2021/086403, filed on Apr. 12, 2021.

(30) Foreign Application Priority Data

Apr. 10, 2020  (CN) .......................... 202010276921.6

(51) Int. Cl.
    *G08G 1/01*   (2006.01)

(52) U.S. Cl.
    CPC ......... *G08G 1/0129* (2013.01); *G08G 1/0133* (2013.01); *G08G 1/0145* (2013.01)

(58) Field of Classification Search
    CPC ... G08G 1/0129; G08G 1/0133; G08G 1/0145
    (Continued)

(56) References Cited

FOREIGN PATENT DOCUMENTS

CN    109285346 A  *  1/2019  ........... G06N 3/0454

OTHER PUBLICATIONS

Chien-Chun Ni, et al., "Community Detection on Networks with Ricci Flow" (Year: 2019), Nature—Scientific Reports.*
(Continued)

*Primary Examiner* — Hunter B Lonsberry
*Assistant Examiner* — Helen Li
(74) *Attorney, Agent, or Firm* — Zhigang Ma

(57) ABSTRACT

A detection method of key road-sections based on Ricci flow is provided and includes: building a weighted road network according to static road network data and actual traffic flow data; calculating initial values of Olivier Ricci curvature at different times; obtaining a weight system of making edges of the weighted road network be with a same value of Olivier Ricci curvature by a Ricci flow iterative process; and calculating direction and degree of weight change of each of the edges corresponding to road-sections, and setting a threshold to extract key road-sections. The method solves problems that the existing methods analyze the key road-sections from the topological structure of the road network without fully considering the actual distribution and transmission characteristics of the traffic flow in the network, is simple and easy; and the detection result more meet the traffic distribution and the flow of the actual road-sections.

3 Claims, 2 Drawing Sheets

(58) Field of Classification Search
USPC .......................................................... 701/118
See application file for complete search history.

(56) References Cited

OTHER PUBLICATIONS

Jayson Sia, et al., "Ollivier-Ricci Curvature-Based Method to Community Detection in Complex Networks" (Year: 2019).*

* cited by examiner

DETECTION METHOD OF KEY ROAD-SECTIONS BASED ON RICCI FLOW

FIELD OF THE DISCLOSURE

The disclosure belongs to the field of geospatial information utilization technologies and relates to detection methods of traffic geographic information, and more particularly to a detection method of key road-sections based on Ricci flow.

DESCRIPTION OF RELATED ART

Increasingly severe urban traffic problems, especially traffic congestion, have seriously affected peoples' daily production and living activities, and are main negative factors affecting healthy development of the city. In essence, a traffic congestion problem is caused by a macro network traffic flow aggregation phenomenon caused by the current road system cannot meet the micro individual travel behavior. Therefore, comprehensive consideration of the road traffic system and the peoples' travel behavior is conducive to comprehensive understanding of transportation performance, optimizing traffic management and alleviating traffic congestion.

Generally speaking, key road-sections are the collection of roads in a road network that have a great impact on a global traffic capacity. Therefore, the key road-section is closely related to the traffic congestion. An accurate extraction of the key road-section can provide a reliable basis for alleviating the traffic congestion. However, most of the existing key road-section extraction methods only extract the key road-section from a topological structure of the road network, and do not fully consider an actual distribution of the traffic flow and a transmission characteristic of the traffic flow in the network.

SUMMARY

A purpose of the disclosure is to provide a detection method of key road-sections based on Ricci flow, an extraction method of the key road-sections in the road network provided by the disclosure combines a curvature flow with a complex network, obtains a weight distribution that makes edges in the network have a same value of Olivier Ricci curvature through a method of Ricci flow iteration, calculates original weights and respectively compares them with weights after the Ricci flow iteration for extracting the key road-sections. The method of the disclosure is simple and easy, and a detection result is more meet the traffic distribution and the flow of an actual road-section.

A detection method of key road-sections based on Ricci flow is provided to achieve the purpose of the disclosure and includes:

step 1, building a weighted road network according to static road network data and actual traffic flow data;

step 2, calculating initial values of Olivier Ricci curvature of the weighted road network at different times;

step 3, obtaining a weight system of making edges of the weighted road network be with a same value of Olivier Ricci curvature by a Ricci flow iterative process; and step 4, calculating direction and degree of weight change of each of the edges corresponding to road-sections, and setting a threshold to extract ones of the road-sections whose weight changes greatly in the Ricci flow iterative process as key road sections.

Specifically, a specific meaning of the static road network data of the step 1 is: a road network built with intersections as nodes and the road-sections as the edges; and the actual traffic flow data of the step 1 includes traffic flow characteristics on the road-sections converted from longitude and latitude information of taxi track point data with global positioning system (GPS) information; and building the weighted road network of the step 1, includes:

step 101, building a static road network;

step 102, mapping the taxi track point data to the corresponding road-sections respectively;

step 103, counting taxi traffic flows of each of the road-sections at the different times;

step 104, building the weighted road network of using the taxi traffic flows as original weights of the road-sections.

Specifically, a calculation formula of Olivier Ricci curvature is that: $Ric_o(e)=1-W_1(m_x, m_y)/d(x,y)$ where $Ric_0(e)$ represents the initial value of Olivier Ricci curvature of the edge e, $m_x$ and $m_y$ respectively represent probability measures of the nodes directly connecting to two endpoints x and y of forming the edge e respectively, $d_x$ and $d_y$ respectively represent numbers of the nodes respectively connecting to the two endpoints x and y, and $m_x=1/d_x$, $m_y=1/d_y$; $W_1(m_x, m_y)$ is a transport distance between the two probability measures $m_x$ and $m_y$; $d(x,y)$ represents a shortest path distance between the endpoint x and the endpoint y; and the step 2 includes:

step 201, performing normalization to original weights respectively; a method of the normalization is:

$$\omega_e^{0\prime} \leftarrow \omega_e^0 - \frac{|E|}{\Sigma_{e\in E}\omega_e^0},$$

where $\omega_e^{0\prime}$ is a normalized weight of the edge e, $\omega_e^0$ is the original weight of the edge e, $|E|$ is the number of the edges in the weighted road network, $\Sigma_{e\in E}\omega_e^0$ is a sum of the original weights of the edges; and step 202, calculating the initial values of Olivier Ricci curvature of the respective edges in the weighted road network.

Specifically, the Ricci flow iterative process of the step 3 is a curvature-guided diffusion process, under the action of the Ricci flow, weights of edges within a community are decreased, while weights of edges connecting the community are increased; the Ricci flow iterative process includes:

step 301, performing weight update according to the initial values of Olivier Ricci curvature and the original weights to obtain updated weights of the edges; wherein a formula of the weight update is that: $\omega_e^k \leftarrow \omega_e^{k-1} - Ric_0 * \omega_e^{k-1}$, where $\omega_e^k$ is a weight value of the edge e after performing k times Ricci flow iterations to the original weight thereof; and $\omega_e^{k-1}$ is a weight value of the edge e after performing k-1 times Ricci flow iterations to the original weight thereof, and k is a positive integer;

step 302, performing second normalization to the updated weights for calculating values of Olivier Ricci curvature of the edges; a calculation formula of the second normalization is that:

$$\omega_e^{k\prime} \leftarrow \omega_e^k - \frac{|E|}{\Sigma_{e\in E}\omega_e^k},$$

where |E| is the number of the edges in the weighted road network, $\Sigma_{e \in E}\omega_e^k$ is the sum of the updated weights of the edges; and step 303, repeating the steps 301 and 302 until the calculated values of Olivier Ricci curvature of the edges in the weighted road network are close to a constant.

Specifically, setting the threshold to extract the one of the road-sections whose weight changes greatly in the Ricci flow iterative process of the step 4, includes:

step 401, calculating a weight difference δ between the original weight and a weight in the weight system after the Ricci flow iterative process of each of the road-sections, to thereby obtain weight differences of the road-sections; and step 402, sorting the weight differences of the road-sections, setting the threshold τ based on a scale of the road network (also referred as size of the road network), and thereby extracting the key road-sections.

The detection method of key road-sections based on Ricci flow is provided by the disclosure, the value of Olivier Ricci curvature in the method is a complex network analysis index that can be used to measure the energy transmission properties in the network. The Ricci flow iterative process is a curvature guided diffusion process, which deforms the space in a way similar to thermal diffusion in some form. The method of the disclosure is a method for extracting the key road-sections of the urban road network from the perspective of flow transmission combined with the actual traffic flow data, which solves the problem that the existing methods only analyze the key road-sections from the topological structure of the road network without fully considering the actual traffic flow distribution of the road network and the flow transmission characteristics of the network.

DETAILED DESCRIPTION OF EMBODIMENTS

The disclosure is further described below in combination with the embodiments and the accompanying drawings, but the disclosure is not limited in any way. Any transformation or replacement based on the teaching of the disclosure belongs to the protection scope of the disclosure.

Figure 1:
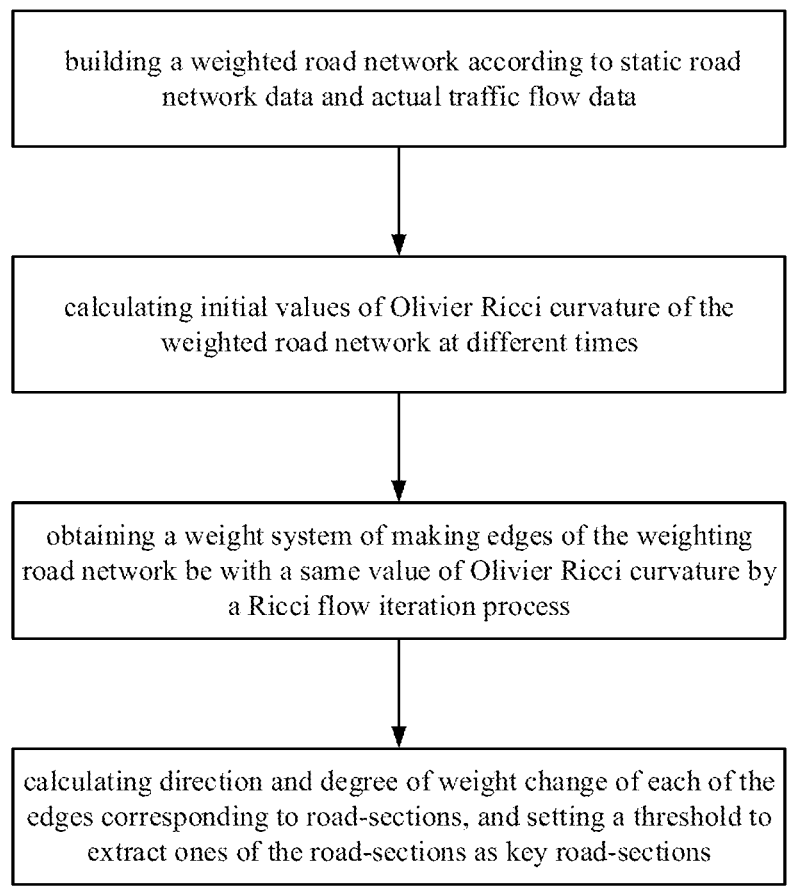
FIG. 1 is a flowchart of a detection method of key road-sections based on Ricci flow of the disclosure.

As shown in FIG. 1, a detection method of key road-sections based on Ricci flow, includes:

step 1, building a weighted road network according to static road network data and actual traffic flow data;

step 2, calculating initial values of Olivier Ricci curvature of the weighted road network at different times;

step 3, obtaining a weight system of making edges of the weighted road network be with a same value of Olivier Ricci curvature by a Ricci flow iterative process; and step 4, calculating direction and degree of weight change of each of the edges corresponding to road-sections, and setting a threshold to extract ones of the road-sections whose weight changes greatly in the Ricci flow iterative process (also referred as setting a threshold to extract key road-sections).

Specifically, the static road network data of the step 1 includes: a road network built with intersections as nodes and the road-sections as the edges; and the actual traffic flow data of the step 1 includes traffic flow characteristics on the road-sections converted from longitude and latitude information of taxi track point data with GPS information. Building the weighted road network of the step 1, includes:

step 101, building a static road network;

step 102, mapping the taxi track point data to the corresponding road-sections respectively;

step 103, counting taxi traffic flows of each of the road-sections at the different times;

step 104, building the weighted road network of the taxi traffic flows as original weights of the road-sections.

Specifically, a calculation formula of Olivier Ricci curvature is that: $Ric_0(e)=1-W_1(m_x, m_y)/d(x,y)$, where $Ric_0(e)$ represents the initial value of Olivier Ricci curvature of the edge e, $m_x$ and $m_y$ respectively represent probability measures of the nodes directly connecting to two endpoints x and y of forming the edge e respectively, $d_x$ and $d_y$ respectively represent numbers of the nodes respectively connecting to the two endpoints x and y, and $m_x=1/d_x$, $m_y=1/d_y$; $W_1(m_x, m_y)$ is a transport distance between the two probability measures $m_x$ and $m_y$; $d(x,y)$ represents a shortest path distance between the endpoint x and the endpoint y.

Specifically, the step 2 includes:

step 201, performing normalization to original weights respectively; a method of the normalization is:

$$\omega_e^{0\prime} \leftarrow \omega_e^0 - \frac{|E|}{\Sigma_{e \in E}\omega_e^0},$$

where $\omega_e^{0\prime}$ is a normalized weight of the edge e, $\omega_e^0$ is the original weight of the edge e, |E| is the number of the edges in the weighted road network, $\Sigma_{e \in E}\omega_e^0$ is a sum of the original weights of the edges; and step 202, calculating the initial values of Olivier Ricci curvature of the respective edges in the weighted road network.

Specifically, the Ricci flow iterative process of the step 3 is a curvature-guided diffusion process, under the action of the Ricci flow, weights of edges within a community are decreased, while weights of edges connecting the community are increased. The Ricci flow iterative process includes:

step 301, performing weight update according to the initial values of Olivier Ricci curvature and the original weights to obtain updated weights of the edges; a formula of the weight update is that: $\omega_e^k \leftarrow \omega_e^{k-1} - Ric_0*\omega_e^{k-1}$, where $\omega_e^k$ is a weight value of the edge e after performing k times Ricci flow iterations to the original weight thereof; $\omega_e^{k-1}$ is a weight value of the edge e after performing k−1 times Ricci flow iterations to the original weight thereof; and k is a positive integer;

step 302, performing second normalization to the updated weights for calculating values of Olivier Ricci curvature of the edges; a calculation formula of the second normalization is that:

$$\omega_e^{k\prime} \leftarrow \omega_e^k - \frac{|E|}{\Sigma_{e \in E}\omega_e^k},$$

where |E| is the number of the edges in the weighted road network, $\Sigma_{e \in E}\omega_e^k$ is the sum of the updated weights of the edges; a calculation formula of calculating values of Olivier Ricci curvature of the step 302 is same with the above calculation formula of Olivier Ricci curvature: $Ric_0(e)=1-W_1(m_x, m_y)/d(x,y)$; and step 303, repeating the steps 301 and 302 until the calculated values of Olivier Ricci curvature of the edges in the weighted road network are close to a constant.

Specifically, setting the threshold to extract the ones of the road-sections whose weight changes greatly in the Ricci flow iterative process of the step 4, includes:

step 401, calculating a weight difference δ between the original weight and a weight in the weight system after the Ricci flow iterative process of each of the road-sections, to thereby obtain weight differences of the road-sections; and step 402, sorting the weight differences of the road-sections, setting the threshold τ based on a scale of the road network(also referred as size of the road network), and extracting the key road-sections.

Figure 2:
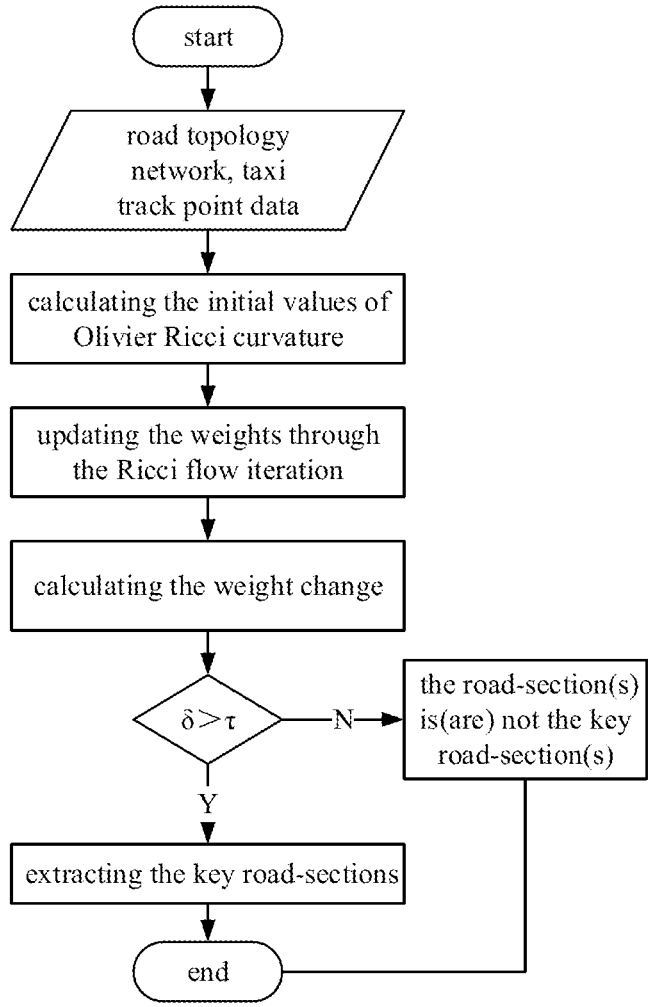
FIG. 2 is a flowchart of the detection method of key road-sections based on Ricci flow according to an embodiment of the disclosure.

As shown in FIG. 2, using the taxi track point data of Beijing on Nov. 1, 2012 and the road network data of Beijing to extract the key road-sections according to the process shown in FIG. 1, including: firstly, mapping the taxi track point data to the road network to build the weighted road network, the road network includes 1364 nodes and 2232 edges; secondly, calculating the value of Olivier Ricci curvature of each edge in the weighted road network; then, obtaining the weight distribution of the edges that make any edges of the weighted road network have the consistent values of Olivier Ricci curvature by the Ricci flow iterative process; finally, setting the threshold τ according to the scale of the network, judging the size relationship between the weight difference δ between the original weight and the converged weight and the threshold τ, and extracting the key road-sections.

The specific implementation steps are as follows:

step A, building a static road network of Beijing, the static road network includes 1364 nodes and 2232 edges;

step B, mapping the taxi track point data on Nov. 1, 2012 to the corresponding road-sections respectively by the "spatial connection" tool in ArcGIS software;

step C, counting the taxi traffic flows of each of the road-sections at the different times;

step D, building the weighted road network of the taxi traffic flows as the original weights of the road-sections;

step E, performing normalization to the original weights; the method of the normalization is:

$$\omega_e^{0\prime} \leftarrow \omega_e^0 - \frac{|E|}{\sum_{e \in E} \omega_e^0},$$

where $\omega_e^{0\prime}$ is a normalized weight of the edge e, $\omega_e^0$ is the original weight of the edge e, |E| is the number of the edges in the weighted road network, $\Sigma_{e \in E}\omega_e^0$ is a sum of the original weights of the edges;

step F, calculating the initial value of Olivier Ricci curvature of each of the edges in the weighted road network, a calculation formula is that: $Ric_0(e)=1-W_1(m_x, m_y)/d(x,y)$, where $m_x=1/d_x$ and $m_y=1/d_x$; $W_1(m_x, m_y)$ is the transport distance between two probability measures $m_x$ and $m_y$, it is generally calculated with the aid of Wasserstein transportation measurement; d(x,y) represents the weighted shortest path distance from the node x to the node y;

step G, performing weight update according to the initial values of Olivier Ricci curvature and the original weights to obtain updated weights of the edges; the formula of the weight update is that: $\omega_e^k \leftarrow \omega_e^{k-1} - Ric_0 * \omega_e^{k-1}$;

step H, performing second normalization to the updated weights for calculating the calculating values of Olivier Ricci curvature of the edges, the calculation formula of the second normalization is that:

$$\omega_e^{k\prime} \leftarrow \omega_e^k - \frac{|E|}{\sum_{e \in E} \omega_e^k},$$

where |E| is the number of the edges in the weighted road network, $\Sigma_{e \in E}\omega_e^k$ is the sum of the updated weights of the edges;

step I, repeating the steps G and H until the calculated values of Olivier Ricci curvature of any edges in the weighted road network are close to a constant;

step J, calculating the weight difference δ between the original weight and a weight after the Ricci flow iterative process of each of the road-sections and then sorting the weight differences;

step K, setting the threshold τ based on the scale of the road network is 2.5, and extracting the key road-sections of 187.

In view of the practical challenges faced by the current transportation network, the extraction method of the key road-sections in the road network provided by the embodiment combines the curvature flow with the complex network, obtains the weight distribution that makes edges in the network have the same value of Olivier Ricci curvature through the method of Ricci flow iteration, calculates the original weights and respectively compares them with the weights after the Ricci flow iteration for extracting the key road-sections. Ricci flow method is based on the geometric concept of curvature. Ricci curvature quantitatively describes how the space bends at each point, while Ricci flow deforms the space in a way similar to heat diffusion. When the Ricci curvature is applied to the discrete network, under the action of the Ricci flow, the weights of the edges within the community in the network will be decreased, and the weights of the edges connecting the community will be increased. The method of the disclosure is a method for extracting the key road-sections of the urban road network from the perspective of flow transmission combined with the actual traffic flow data, which solves the problem that the existing methods only analyze the key road-sections from the topological structure of the road network without fully considering the actual traffic flow distribution of the road network and the flow transmission characteristics of the network. The key road-sections in the road network are often closely related to congestion, so extracting the key road-sections in the road network can provide a good reference for micro solving the current situation of congestion.

What is claimed is:

1. A detection method of key road-sections based on Ricci flow, comprising:

step 1, building a weighted road network according to static road network data and actual traffic flow data;

step 2, calculating initial values of Olivier Ricci curvature of the weighted road network at different times;

step 3, obtaining a weight system of making edges of the weighted road network be with a same value of Olivier Ricci curvature by a Ricci flow iterative process; and step 4, calculating direction and degree of weight change of each of the edges corresponding to road-sections, and setting a threshold to extract ones of the road-sections as key road-sections;

wherein the static road network data of the step 1 comprise a road network built with intersections as nodes and the road-sections as the edges; and the actual traffic flow data of the step 1 comprise traffic flow characteristics on the road-sections converted from longitude and latitude information of taxi track point data with global positioning system (GPS) information;

wherein building the weighted road network of the step 1, comprises:
step 101, building a static road network;
step 102, mapping the taxi track point data to the corresponding road-sections respectively;
step 103, counting taxi traffic flows of each of the road-sections at the different times;
step 104, building the weighted road network of using the taxi traffic flows as original weights of the road-sections;

wherein a calculation formula of Olivier Ricci curvature is that: $Ric_0(e)=1-W_1(m_x, m_y)/d(x,y)$, where $Ric_0(e)$ represents the initial value of Olivier Ricci curvature of the edge e, $m_x$ and $m_y$ respectively represent probability measures of the nodes directly connecting to two endpoints x and y of forming the edge e respectively, $d_x$ and $d_y$ respectively represent numbers of the nodes respectively connecting to the two endpoints x and y, and $m_x=1/d_x$, $m_y=1/d_y$; $W_1(m_x,m_y)$ is a transport distance between the two probability measures $m_x$ and $m_y$; $d(x,y)$ represents a shortest path distance between the endpoint x and the endpoint y; and wherein the step 2 comprises:
step 201, performing normalization to the original weights respectively; wherein a method of the normalization is:

$$\omega_e^{0\prime} \leftarrow \omega_e^0 - \frac{|E|}{\sum_{e \in E} \omega_e^0},$$

where $\omega_e^{0\prime}$ is a normalized weight of the edge e, $\omega_e^0$ is the original weight of the edge e, $|E|$ is the number of the edges in the weighted road network, $\Sigma_{e \in E}\omega_e^0$ is a sum of the original weights of the edges; and step 202, calculating the initial values of Olivier Ricci curvature of the respective edges in the weighted road network;

wherein the detection method of key road-sections based on Ricci flow further comprises the following steps:

performing traffic management by traffic police on the key road-sections to alleviate traffic congestion; and
reminding the key road-sections to people, thereby facilitating the people avoiding the traffic congestion.

2. The detection method of key road-sections based on Ricci flow according to claim 1, wherein the Ricci flow iterative process of the step 3 is a curvature-guided diffusion process, under the action of the Ricci flow, weights of edges within a community are decreased, while weights of edges connecting the community are increased;

wherein the Ricci flow iterative process comprises:
step 301, performing weight update according to the initial values of Olivier Ricci curvature and the original weights to obtain updated weights of the edges; wherein a formula of the weight update is that: $\omega_e^k \leftarrow \omega_e^{k-1} - Ric_0 * \omega_e^{k-1}$, where $\omega_e^k$, is a weight value of the edge e after performing k times Ricci flow iterations to the original weight thereof, and k is a positive integer;

step 302, performing second normalization to the updated weights for calculating values of Olivier Ricci curvature of the edges; wherein a calculation formula of the second normalization is that:

$$\omega_e^{k\prime} \leftarrow \omega_e^k - \frac{|E|}{\sum_{e \in E} \omega_e^k},$$

where $|E|$ is the number of the edges in the weighted road network, $\Sigma_{e \in E}\omega_e^k$ is the sum of the updated weights of the edges;

step 303, repeating the steps 301 and 302 until the calculated values of Olivier Ricci curvature of the edges in the weighted road network are close to a constant.

3. The detection method of key road-sections based on Ricci flow according to claim 2, wherein setting the threshold to extract the ones of the road-sections as the key road-sections of the step 4, comprises:
step 401, calculating a weight difference δ between the original weight and a weight in the weight system after the Ricci flow iterative process of each of the road-sections, to thereby obtain weight differences of the road-sections; and
step 402, sorting the weight differences of the road-sections, setting the threshold τ based on a scale of the road network, and thereby extracting the key road-sections.

* * * * *